United States Patent [19]

Dyer

[11] Patent Number: 4,540,476
[45] Date of Patent: Sep. 10, 1985

[54] PROCEDURE FOR MAKING NICKEL ELECTRODES

[75] Inventor: Christopher K. Dyer, Summit, N.J.

[73] Assignee: AT&T Bell Laboratories, Murray Hill, N.J.

[21] Appl. No.: 678,225

[22] Filed: Dec. 5, 1984

Related U.S. Application Data

[63] Continuation of Ser. No. 448,638, Dec. 10, 1982, abandoned.

[51] Int. Cl.³ .............................................. C25B 1/00
[52] U.S. Cl. ................................ 204/96; 204/DIG. 9
[58] Field of Search ............................. 204/96, DIG. 9

[56] References Cited

U.S. PATENT DOCUMENTS

| | | | |
|---|---|---|---|
| 748,609 | 1/1904 | Hunt | 204/96 |
| 3,414,494 | 12/1968 | Cuenot | 204/96 |
| 3,466,231 | 9/1969 | MacArthur | 204/96 |
| 3,484,346 | 12/1969 | Bulan et al. | 204/96 |
| 3,779,810 | 12/1973 | Kanetsuki et al. | 204/96 |

*Primary Examiner*—R. L. Andrews
*Attorney, Agent, or Firm*—Walter G. Nilsen

[57] ABSTRACT

A process is described for electrolytically producing nickel electrodes by subjecting a porous nickel structure (generally a nickel plaque) to alternating anodic and cathodic pulses in an aqueous halide (generally chloride) solution. The alternating pulses first anodically dissolve the nickel from the porous nickel plaque and then cathodically precipitate the nickel in the form of the hydroxide. Particularly attractive is the use of a stable, simple solution, room temperature operation and the broad variation in operating conditions (pH, etc.) that still produce optimum results.

12 Claims, 2 Drawing Figures

PROCEDURE FOR MAKING NICKEL ELECTRODES

This is a continuation of application Ser. No. 448,638, filed Dec. 10, 1982 now abandoned.

TECHNICAL FIELD

The invention relates to a process for making nickel electrodes primarily for use in cells and to the resultant nickel electrode and to cells containing the resultant nickel electrode.

BACKGROUND OF THE INVENTION

Nickel electrodes are used in a variety of devices generally referred to as energy sources such as cells or batteries. Highly desirable in such electrodes is high energy density, high percent utilization of active material, high discharge and charging rates, and high recycling capacity. It is also highly desirable to achieve these electrode characteristics with a fabrication procedure which is easily adaptable to commercial manufacture and does not involve corrosive materials or excessively complex or expensive equipment.

A frequently used procedure for making nickel electrodes is known as the vacuum impregnation procedure. Here, a porous structure, usually in the form of a nickel plaque, is filled under vacuum with an aqueous solution of a nickel salt. The salt is reduced to the hydroxide by treatment with an alkaline solution, and the liquid allowed to evaporate, leaving the hydroxide. The amount of material loaded at one time is, of course, limited by the solubility of the salt in the aqueous solution. Typically, at least four impregnation cycles, requiring four or five days to complete, are required to achieve commercially acceptable electrodes by this method.

Another method is described in U.S. Pat. No. 3,214,355 issued to Ludwig Kandler on Oct. 26, 1965, involving the electrolytic deposition of nickel hydroxide directly in the pores of the electrode structure as a cathode. This is carried out in an acid electrolyte containing nickel ions and reducible ions, the redox potential of which is more positive than that of the nickel ions. During the electrolysis, the reducible ions, for example, nitrate ions, prevent the reduction of the nickel ions within the cathode structure by themselves being reduced. The resultant consumption of hydrogen ions increases the pH value of the electrolyte within the cathode structure to the extent that slow precipitation of nickel hydroxide results.

The electrolytic impregnation procedure has been further improved so as to yield high energy densities and long cycle life without significant degradation of energy density. These improvements are disclosed in U.S. Pat. No. 3,653,967 issued to R. L. Beauchamp on Apr. 4, 1972. Particularly significant is the use of high temperature (above 85 degrees C.) during the impregnation process and the inclusion of nitrite ions in the electrolytic solution to control the pH of the bath.

Particularly desirable is an impregnation procedure for nickel electrodes which involves an easily handled, simple solution, moderate temperatures without the necessity of critical control and a procedure which produces optimum use without critical control of operational parameters. Stated in more general terms, it is desirable to have an impregnation procedure suitable for commercial manufacture where the impregnation solution is not highly corrosive, where temperature need not be precisely controlled and impregnation results (energy density, cycle lift, etc.) are not critically dependent on the conditions of the impregnation procedure.

SUMMARY OF THE INVENTION

The invention is a process for making a battery cell comprising a nickel electrode in which the nickel electrode is made from a conducting nickel structure (usually a porous nickel plaque) by electrolytically converting nickel metal from the porous nickel structure into active material. The active material involves nickel ions believed to be in the form of nickel hydroxide. The electrolytic process involves impressing an alternating potential on the porous nickel structure such that nickel dissolves on the oxidizing part of the cycle and on the reducing part of the cycle the pH inside the porous nickel structure is raised sufficiently to precipitate oxidized nickel as hydroxide. The electrolytic solution should be sufficiently conductive to allow reasonable rates for the conversion process (greater than 0.001 mho-cm) and contain a substance (usually an anion) that enhances the dissolution of nickel during the anodic or oxidizing part of the cycle. It is believed that this may be due to dissolution or breakdown of the protective or passivating film (believed to be an oxide film) on the nickel surface. Typical substances to meet this requirement are halide ions (particularly chloride and bromide ions) which are usually introduced in the form of KCl or KBr salts. Although the process is not highly sensitive to pH, generally pH values close to neutral (i.e., pH 3 to 10) are preferred with 6–8 most preferred. These pH ranges are preferred because of the extremely high loading factors obtained. This procedure yields extremely high loading factors (as measured by cell discharge measurement) without the necessity of close control of process parameters.

DETAILED DESCRIPTION

Figure 1:
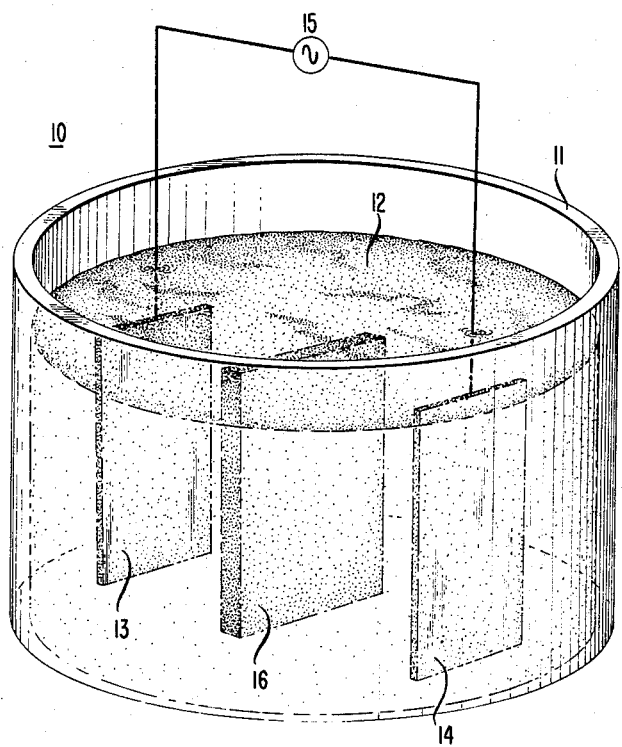
FIG. 1 shows an apparatus useful in loading nickel electrodes in accordance with the invention.

The invention is based on the observation that excellent electrolytic loading results are obtained for nickel electrodes by first anodically dissolving nickel from a conducting nickel structure using an anodic electrical pulse and then precipitating the dissolved nickel using a cathodic electrical pulse. This was done in an electrolytic solution containing ions believed to reduce the protective nature of surface films on the nickel metal (believed to be an oxide layer) to permit dissolution of the nickel metal. The process can be carried out on any nickel structure useful for nickel electrodes in battery cells but is most conveniently carried out on nickel plaques conventionally used for nickel electrodes. Such electrodes are useful in a wide variety of battery cells including nickel-hydrogen cells, nickel-cadmium cells, nickel-zinc cells, and nickel-iron cells. Also included in the invention are batteries with one or more cells as described above (i.e., with nickel electrodes made in accordance with the invention).

A large variety of conducting nickel structures may be used in the practice of the invention. The structure should contain significant amounts of nickel, say 30 or 50 or 90 percent nickel by weight. Also, it is preferred that the conducting nickel structure be porous (preferably porosities of from 60–90 percent porosity) so that a high surface area of nickel is exposed for conversion and preferably the porous nickel plaques should be nearly pure nickel (at least 99 percent by weight).

As stated above, the electrolytic solution should contain sufficient electrolyte for a conductivity of at least 0.001 mho-cm and a substance which promotes anodic dissolution of nickel. Various salts might be added to improve conductivity.

Preferred for the composition of the electrolytic solution is an aqueous solution containing a halide ion, preferably bromide or chloride with chloride most preferred. Although any convenient cation can be used in the electrolytic solution, generally an alkali-metal ion (potassium, sodium, etc.) is most convenient. More than one cation and/or anion may be used.

Concentration of halide ion may vary over large limits consistent with the minimum conductivity of the solution set forth above and possible precipitation of the salt in the nickel plaque. A typical range is from 0.01 molar to saturation or just below saturation, with the range from 0.1 to 2 molar preferred. Most preferred, especially for KCl is from 0.2 to 1.2 molar.

Generally, the process is not extremely sensitive to pH particularly in the range from slightly acidic (6.0) to slightly basic (8.0). Inside the plaque, nickel that has been anodically dissolved during the anodic part of the cycle is precipitated during the cathodic part of the cycle due to an increase in the concentration of $OH^-$ ions.

An important part of the conversion process is repeated cycling of the electrode potentials so as to expose the nickel plaque alternately to anodic and cathodic potentials. For convenience, these varying potentials are often spoken of as anodic and cathodic pulses but the exact nature of the potential variation is not of particular importance as long as the nickel plaque is exposed to anodic and cathodic potentials. Indeed, the plaque need not be connected to a power supply. For example, putting the plaque in close proximity to one or more electrodes may be sufficient and in some cases may be preferred.

The frequency of the cycling may vary over large limits. Typical values are in the range from 0.01 to 100 Hz with 0.1 to 10 preferred and 0.2 to 2.0 most preferred. Total cycles may vary over large limits and depend on the type of conducting nickel structure used as well as other variables. Total cycles between 400 and 4000 are typical. Both too few cycles and too many cycles tend to reduce discharge capacity from maximum values.

The anodic pulses are used to dissolve some of the nickel from the plaque (believed to be divalent nickel) and the cathodic pulse to precipitate the dissolved nickel as the active material. It is believed that the precipitate is in the form of nickel hydroxide.

The potentials of the various pulses may vary over large limits provided the anodic potential is sufficient to dissolve the nickel and the cathodic pulse is sufficient to precipitate the dissolved nickel. Generally, an anodic potential more positive than 0.1 volts on the hydrogen scale (nhe) is used and a cathodic potential more negative than 0.0 volts (nhe) is used. More positive anodic potentials and more negative cathodic potentials may be used to increase rate, current, etc.

The impregnation process is usually monitored by observing the current passing in each direction. The exact waveform of the potential is not generally of importance. A sinusoidal variation is often convenient but a square wave is often more convenient for monitoring the impregnation process. Various other waveforms including asymmetric waveforms are also useful. The ratio of anodic to cathodic charge in a given cycle may vary between 10 and 0.1.

A number of experiments were carried to demonstrate the usefulness of the impregnation procedure. A variety of counter-electrodes may be used (graphite, titanium, platinum, stainless steel, etc.) but in these experiments graphite was used. The plaque was an Eagle Pitcher Ni sintered on a wire mesh support with overall thickness of 0.030 inches and an exposed area of one centimeter squared. The plaque was electrically connected to a conventional galvonostat (model 371 EG and G) was used together with a square waveform generator.

After cycling, the electrodes were washed in distilled water and charged and discharged in 30 percent KOH at 2 mA/cm$^2$ (foil electrodes) or 250 mA/cm$^2$ (EP-sinter) capacities were calculated on discharge to $\sim$0.0 V (nhe). The reference electrode was a cathodically charged Pd/PdH$_x$ wire or a standard calomel electrode.

The results of some of these experiments are summarized in Table I.

| Summary of Electrolytic Loading Experiments | | | | |
|---|---|---|---|---|
| Solution Comp. | Freq. (Hz) | Peak Curr. (mA) | Total Cycles | Discharge Capacity (Coulombs) |
| 1.0 M KCl | 1.0 | +500 −250 | 500 | 16.5 |
| 1.0 M KCl | 1.0 | +500 −250 | 1000 | 19.0 |
| 1.0 M KCl | 1.0 | +500 −175 | 500 | 7.5 |
| 1.0 M KCl | 1.0 | +500 −325 | 500 | 24.5 |
| 1.0 M KCl | 1.0 | +500 −500 | 500 | 33 |
| 1.0 M KCl | 1.0 | +500 −600 | 500 | 26 |
| 1.0 M KCl | 1.0 | +650 −325 | 1000 | 22.5 |
| 1.0 M KCl | 1.0 | +750 −375 | 500 | 21.0 |
| 1.0 M KCl | 1.0 | ±225 | 1111 | 31.0 |
| 1.0 M KCl | 1.0 | ±300 | 833 | 34.5 |
| 1.0 M KCl | 1.0 | ±375 | 667 | 33.0 |
| 1.0 M KCl | 1.0 | ±425 | 588 | 33.5 |
| 1.0 M KCl | 1.0 | ±375 | 434 | 29.5 |
| 1.0 M KCl | 1.0 | ±300 | 1600 | 49 |
| 1.0 M KCl | 1.0 | +300 −200 | 1600 | 37 |
| 1.0 M KCl | 1.0 | ±300 | 2400 | 64.5 |
| 1.0 M KCl | 1.0 | ±300 | 3200 | 69 |
| 1.0 M KCl | 1.0 | ±225 | 4400 | 68 |
| 1.0 M KCl | 1.0 | ±400 | 2500 | 69 |
| 1.0 M KCl | 1.0 | ±400 | 1400 | 61 |
| 1.0 M KCl | 1.0 | ±400 | 1600 | 61 |
| 1.0 M KCl | 1.0 | ±500 | 1000 | 57 |
| 1.0 M KCl | 1.0 | ±500 | 1200 | 62 |
| 1.0 M KCl | 1.0 | ±500 | 1400 | 63 |
| 1.0 M KCl | 0.5 | ±150 | 1200 | 51.5 |
| 1.0 M KCl | 0.5 | ±150 | 1400 | 58 |
| 1.0 M KCl | 0.5 | ±150 | 1600 | 64 |
| 1.0 M KCl | 0.5 | ±150 | 1600 | 67 |
| 1.0 M KCl | 0.5 | ±150 | 1800 | 75 |
| 1.0 M KCl | 0.5 | ±150 | 2000 | 70.5 |
| 1.0 M KCl | 0.5 | ±150 | 2000 | 76 |
| 1.0 M KCl | 0.5 | ±150 | 3200 | 72.5 |
| 0.2 M KCl | 0.5 | ±150 | 2000 | 37 |

-continued

Summary of Electrolytic Loading Experiments

| Solution Comp. | Freq. (Hz) | Peak Curr. (mA) | Total Cycles | Discharge Capacity (Coulombs) |
|---|---|---|---|---|
| 1.0 M KCl | 0.5 | ±100 | 2000 | 54 |
| 1.0 M KCl | 0.5 | ±100 | 2500 | 64 |
| 1.0 M KCl | 0.5 | ±100 | 3000 | 68 |
| 1.0 M KCl | 0.5 | ±200 | 800 | 50 |
| 1.0 M KCl | 0.5 | ±200 | 975 | 55 |
| 1.0 M KCl | 0.5 | ±200 | 1000 | 59 |
| 1.0 M KCl | 0.5 | ±200 | 1200 | 75.5 |
| 1.0 M KCl | 0.5 | ±200 | 1400 | 70 |
| 1.0 M KCl | 0.5 | ±200 | 1600 | 78 |
| 1.0 M KCl | 0.5 | ±250 | 700 | 52 |
| 1.0 M KCl | 0.5 | ±250 | 800 | 60 |
| 1.0 M KCl | 0.5 | ±250 | 900 | 67 |
| 1.0 M KCl | 0.5 | ±250 | 1000 | 71 |
| 1.0 M KCl | 0.5 | ±250 | 1000 | 65 |
| 1.0 M KCl | 0.25 | ±75 | 1600 | 66.5 |
| 1.0 M KCl | 0.25 | ±75 | 3200 | 82.5 |
| 1.0 M KCl | 0.25 | ±100 | 1600 | 83.5 |
| 1.0 M KCl | 0.25 | ±125 | 800 | 62.5 |
| 1.0 M KCl | 0.25 | ±125 | 1000 | 72 |
| 1.0 M KCl | 0.25 | ±125 | 1200 | 81 |
| 1.0 M KCl | 0.25 | ±125 | 1600 | 13 |
| 1.0 M KCl | 0.25 | ±150 | 700 | 62.5 |
| 1.0 M KCl | 0.25 | ±150 | 800 | 72 |
| 1.0 M KCl | 0.25 | ±150 | 900 | 30 |
| 1.0 M KCl | 0.25 | ±175 | 600 | 67 |
| 1.0 M KCl | 0.25 | ±200 | 400 | 51 |
| 1.0 M KBr | 0.25 | ±125 | 1000 | 49 |
| 1.0 M KBr | 0.25 | ±125 | 1400 | 55 |
| 1.0 M KBr | 0.25 | ±175 | 1200 | 80 |
| 1.0 M KBr | 0.25 | ±225 | 600 | 60 |
| 1.0 M KBr | 0.25 | ±225 | 800 | 78 |
| 1.0 M KBr | 0.25 | ±225 | 1000 | 76 |
| 1.0 M KBr | 0.25 | ±275 | 600 | 73 |
| 1.0 M KBr | 0.5 | ±200 | 1600 | 38 |
| 1.0 M KBr | 0.5 | ±250 | 1000 | 65 |

As can be seen from Table I, excellent nickel impregnation capacities can be obtained using the inventive process. Both asymmetric and symmetric waveforms may be used but symmetric waveforms yield greater capacities under conditions of these experiments. Lower frequencies (0.25 Hz) also seem to yield higher capacities but the dependence is not strong and other conditions (i.e., frequency, electrolyte, concentration, etc.) might affect that conclusion. A sinusoidal variation is often convenient but a square wave is often more convenient for monitoring the impregnation process. Various other waveforms are also useful.

A particularly convenient way of carrying out the impregnation process is illustrated in FIG. 1. FIG. 1 shows an apparatus 10 useful for the impregnation of nickel plaques by a contactless process. It is made up of a container 11 filled with electrolytic solution and equipped with two inert electrodes (generally made of an inert metal such as platinum, platinized titanium, etc.). The potential of these electrodes 13 and 14 is varied from anodic to cathodic by use of a varying source of current 15 (generally a galvanostat with waveform generator). The nickel plaque 16 to be impregnated is located between the two electrodes 13 and 14. The varying potentials on the electrodes produce varying potentials on the plaque to be impregnated so as to produce anodic dissolution of the nickel followed by cathodic production of hydroxyl ions to precipitate the dissolved nickel.

Figure 2:
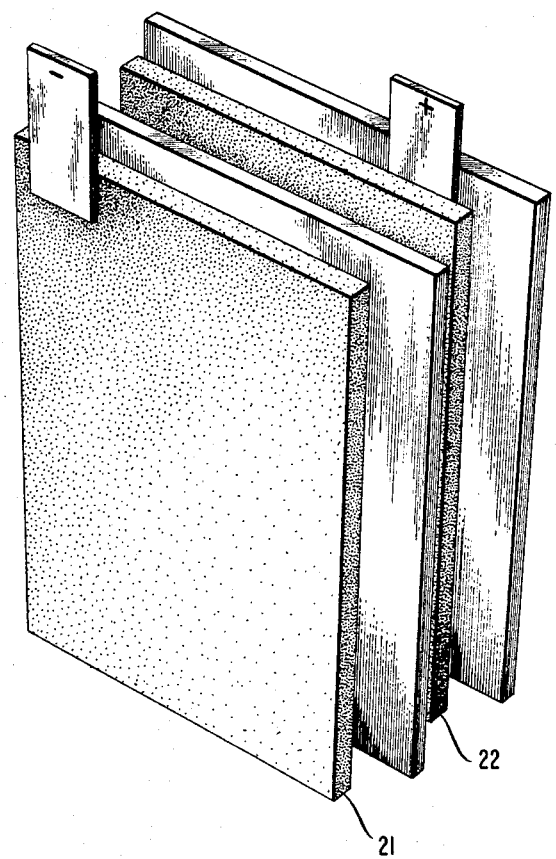
FIG. 2 shows a typical battery cell structure with both positive and negative electrodes, with the positive electrodes made in accordance with the invention.

FIG. 2 shows several components of a typical alkaline battery 20, namely cadmium battery. The negative electrode 21 is a cadmium electrode. The positive electrode 22 is a nickel electrode made by impregnation in accordance with the invention. Also shown are separators between electrodes used to electrically insulate the negative electrode from the positive electrode. Here the separators are made from micro-porous polymeric material. A multiplicity of such positive electrodes and negative electrodes may be assembled so as to make up a completed battery. The electrolyte in this particular battery is a 30 percent by weight KOH in water. In fabricating such a battery the individual electrodes are usually formed (electrolytically cycling the electrodes several times) and then assembled in the discharged condition. On charging, the battery becomes ready for use.

What is claimed is:

1. A process for the fabrication of an aqueous battery cell in which the battery cell comprises at least one nickel electrode characterized in that the nickel electrode is made by a procedure comprising the step of exposing a conducting nickel structure to alternate anodic and cathodic potentials in an electrolytic solution with conductivity greater than 0.001 mho-cm, said alternating anodic and cathodic pulses occurring at a frequency between 0.01 and 100 Hz and which comprises ions that enhance dissolution of metallic nickel from the conducting nickel structure and cathodically reduce water to produce a sufficiently high hydroxide concentration to precipitate the anodically oxidized metallic nickel as active material and in which the conducting nickel structure is a porous nickel plaque, and the nickel in the active material originates only from the porous nickel plaque.

2. The process of claim 1 in which the battery cell is selected from the group consisting of nickel-hydrogen cells, nickel-cadmium cells, nickel-zinc cells, and nickel-iron cells.

3. The process of claim 1 in which the electrolytic solution comprises a halide ion.

4. The process of claim 3 in which the halide ion is selected from the group consisting of bromide ion and chloride ion.

5. The process of claim 3 in which the concentration of halide ion is between 0.01 molar and saturation.

6. The process of claim 5 in which the concentration is between 0.1 and 2 molar.

7. The process of claim 6 in which the halide ion is chloride ion added in the form of KCl and the concentration of KCl is between 0.2 and 1.2 molar.

8. The process of claim 1 in which the pH of the electrolytic solution is between 3 and 10.

9. The process of claim 8 in which the pH is between 6.0 and 8.0.

10. The process of claim 1 in which the frequency is between 0.1 and 10 Hz.

11. The process of claim 10 in which the frequency is between 0.2 and 2 Hz.

12. The process of claim 1 in which the anodic potential is more positive than 0.1 volts (nhe) and the cathodic potential is more negative than 0.0 volts (nhe).

* * * * *